(12) United States Patent
Miller

(10) Patent No.: US 8,749,929 B1
(45) Date of Patent: Jun. 10, 2014

(54) CIRCUIT INTERRUPTER PROVIDING GROUND FAULT PROTECTION AND SYSTEM INCLUDING THE SAME

(71) Applicant: Eaton Corporation, Cleveland, OH (US)

(72) Inventor: Theodore Miller, Oakdale, PA (US)

(73) Assignee: Eaton Corporation, Cleveland, OH (US)

( * ) Notice: Subject to any disclaimer, the term of this patent is extended or adjusted under 35 U.S.C. 154(b) by 41 days.

(21) Appl. No.: 13/716,656

(22) Filed: Dec. 17, 2012

(51) Int. Cl.
*H02H 3/00* (2006.01)
*H02H 9/08* (2006.01)

(52) U.S. Cl.
USPC ............... 361/42; 361/43; 361/44; 361/45; 361/46; 361/47; 361/48; 361/49

(58) Field of Classification Search
CPC ......... H01H 1/128; H02H 3/16; H02H 3/167; H02H 3/17
USPC ............................................................ 361/42
See application file for complete search history.

(56) References Cited

U.S. PATENT DOCUMENTS

| | | | | |
|---|---|---|---|---|
| 3,963,963 A | * | 6/1976 | Schade, Jr. ........................ | 361/44 |
| 4,045,822 A | * | 8/1977 | Schade, Jr. ........................ | 361/45 |
| 4,216,515 A | * | 8/1980 | Van Zeeland ..................... | 361/45 |
| 4,216,516 A | * | 8/1980 | Howell ............................. | 361/45 |
| 4,914,541 A | | 4/1990 | Tripodi et al. | |
| 5,940,256 A | * | 8/1999 | MacKenzie et al. ............. | 361/42 |
| 5,982,593 A | | 11/1999 | Kimblin et al. | |
| 6,377,055 B1 | * | 4/2002 | Macbeth et al. ................. | 324/522 |
| 8,289,664 B2 | * | 10/2012 | Haines et al. ..................... | 361/42 |
| 2002/0149891 A1 | * | 10/2002 | Neiger et al. ..................... | 361/42 |
| 2004/0136125 A1 | * | 7/2004 | Nemir et al. ...................... | 361/42 |
| 2006/0072256 A1 | * | 4/2006 | Miller et al. ...................... | 361/42 |
| 2010/0157486 A1 | * | 6/2010 | Parker et al. ...................... | 361/2 |

FOREIGN PATENT DOCUMENTS

GB   2 269 064 A   1/1994

OTHER PUBLICATIONS

European Patent Office, "International Search Report and Written Opinion", Dec. 10, 2013, 10 pp.

* cited by examiner

*Primary Examiner* — Dharti Patel
(74) *Attorney, Agent, or Firm* — Eckert Seamans Cherin & Mellott, LLC; Nathaniel C. Wilks

(57) ABSTRACT

A circuit interrupter includes a trip actuator configured to cooperate with an operating mechanism to trip open separable contacts. The circuit interrupter also includes a ground fault sensor configured to sense a difference between a current through a first electrical conductor and a current through a second electrical conductor and to output an output current based on the sensed difference and a ground fault amplifier circuit configured to convert the output current to an output voltage. The circuit interrupter also includes first and second switches configured to electrically connect the output of the ground fault sensor to the ground fault amplifier circuit and the trip actuator, respectively. The circuit interrupter also includes a processor configured to control operation of the first and second switches and, when the first switch is closed, to control operation of the trip actuator based on the output voltage.

21 Claims, 3 Drawing Sheets

CIRCUIT INTERRUPTER PROVIDING GROUND FAULT PROTECTION AND SYSTEM INCLUDING THE SAME

BACKGROUND

1. Field

The disclosed concept relates generally to electrical switching apparatus and, more particularly, to circuit interrupters. The disclosed concept further relates to circuit interrupters providing ground fault protection. The disclosed concept also pertains to systems providing ground fault protection.

2. Background Information

One type of electrical switching apparatus is a circuit interrupter. Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Circuit breakers typically include separable contacts. The separable contacts may be operated either manually by way of an operator handle or automatically in response to a detected fault condition. Typically, such circuit breakers include an operating mechanism, which is designed to rapidly open and close the separable contacts, and a trip mechanism, such as a trip unit, which senses a number of fault conditions to trip the breaker automatically. Upon sensing a fault condition, the trip unit trips the operating mechanism to a trip state, which moves the separable contacts to their open position.

FIG. 1 is a circuit diagram of a system including a prior circuit interrupter 1. The circuit interrupter 1 is electrically connected to a power source 2 and a neutral 3 on its upstream side and a load circuit 4 on its downstream side. The circuit interrupter 1 includes first and second electrical conductors 5,6 electrically connected to outputs of the power source 2. The circuit interrupter 1 also includes separable contacts 7 and an operating mechanism 8 which is configured to open and close the separable contacts 7. The circuit interrupter 1 further includes a trip circuit which is electrically connected between the first and second electrical conductors 5,6. The trip circuit includes a trip actuator 9 which cooperates with the operating mechanism 8 to trip open the separable contacts 7. The trip actuator 9 includes a trip coil 10 which initiates tripping of the separable contacts when sufficient current is passed therethrough. The trip actuator 9 also includes a silicon controlled rectifier (SCR) 11 which turns on and off to control whether current passes through the trip coil 10.

The circuit interrupter 1 includes a ground fault protection circuit which detects a ground fault condition. A ground fault condition can arise when current flows to ground 20 on the downstream side of the circuit interrupter 1. A ground fault load 21 (shown in phantom line drawing) represents an impedance between the downstream side of the circuit interrupter 1 and ground 20. The ground fault condition can be detected based on a difference between currents in the first and second electrical conductors 5,6 inside the circuit interrupter 1. The ground fault protection circuit includes a current transformer 12 that senses a ground fault current as a difference between the current passing through the first electrical conductor 5 and the second electrical conductor 6. The ground fault protection circuit also includes an amplifier circuit 13 that converts the sensed ground fault current to a voltage and outputs it to a processor 14.

The processor 14 is powered by a power supply 15 which converts alternating current power from the first and second electrical conductors 5,6 to direct current power. The processor 14 determines whether a ground fault exists based on the converted ground fault current from the amplifier circuit 13. When the processor 14 determines that a ground fault condition exists, the processor 14 outputs a signal to the gate of the SCR 11 to turn on the SCR 11, thus allowing current to pass through the trip coil 10 and cause the separable contacts 7 to trip open.

UL943 is a standard for ground fault circuit interrupters. According to UL943, at a ground fault current of 264 mA, the circuit interrupter 1 should trip the power circuit to the load 4 within 25 ms. However, during a powering up period of the processor 14 and power supply 15, the response time of the processor 14 to the ground fault current may not be fast enough to meet this requirement of UL943.

There is room for improvement in circuit interrupters.

SUMMARY

These needs and others are met by embodiments of the disclosed concept, which provide a circuit interrupter in which an output of a ground fault sensor is electrically connectable to a trip actuator such that the trip actuator can be controlled directly by the output of the ground fault sensor.

In accordance with aspects of the disclosed concept, a circuit interrupter comprises: a first electrical conductor configured to electrically connect to a first output of a power source; a second electrical conductor configured to electrically connect to a second output of the power source or a neutral; separable contacts; an operating mechanism configured to open and close the separable contacts; a trip circuit electrically connected between the first electrical conductor and the second electrical conductor, the trip circuit including a trip actuator configured to cooperate with the operating mechanism to trip open the separable contacts; a ground fault sensor configured to sense a difference between a current through the first electrical conductor and a current through the second electrical conductor and to output an output current based on the sensed difference; a first switch electrically connected to the ground fault sensor; a second switch electrically connected between the ground fault sensor and trip actuator such that when the second switch is closed the trip actuator is controlled by the sensor output signal or current; a ground fault amplifier circuit electrically connectable to the ground fault sensor through the first switch, the ground fault amplifier circuit being configured to convert the output current to an output voltage; a power supply configured to provide direct current power; and a processor configured to receive the direct current power, to control operation of the first and second switches and, when the first switch is closed, to control operation of the trip actuator based on the output voltage.

In accordance with other aspects of the disclosed concept, a circuit interrupter comprises: a first electrical conductor configured to electrically connect to a first output of a power source; a second electrical conductor configured to electrically connect to a second output of the power source or a neutral; separable contacts; an operating mechanism configured to open and close the separable contacts; a trip circuit electrically connected between the first electrical conductor and the second electrical conductor, the trip circuit including a trip actuator configured to cooperate with the operating mechanism to trip open the separable contacts; a ground fault sensor configured to sense a difference between a current through the first electrical conductor and a current through the second electrical conductor and to output an output current based on the sensed difference; a switch electrically connected to the ground fault sensor; a ground fault amplifier circuit electrically connectable to the ground fault sensor through the switch, the ground fault amplifier circuit being configured to convert the output current to an output voltage; a diode electrically connected between the ground fault sensor and the trip circuit; a power supply configured to provide direct current power; and a processor configured to receive the direct current power, to control operation of the switch and, when the switch is closed, to control operation of the trip actuator based on the output voltage, wherein the ground fault sensor is electrically connected to the trip actuator such that when the switch is open the trip actuator is controlled by the output current.

In accordance with other aspects of the disclosed concept, a system comprises: a power source having first and second outputs; a load circuit; and a circuit interrupter comprising: a first electrical conductor electrically connected to the first output of the power source; a second electrical conductor electrically connected to the second output of the power source; separable contacts electrically connected in series with the load circuit between the first and second electrical conductors; an operating mechanism configured to open and close the separable contacts; a trip circuit electrically connected between the first electrical conductor and the second electrical conductor, the trip circuit including a trip actuator configured to cooperate with the operating mechanism to trip open the separable contacts; a ground fault sensor configured to sense a difference between a current through the first electrical conductor and a current through the second electrical conductor and to output an output current based on the sensed difference; a first switch electrically connected to the ground fault sensor; a second switch electrically connected between the ground fault sensor and the trip actuator such that when the second switch is closed the trip actuator is controlled by the output current; a ground fault amplifier circuit electrically connectable to the ground fault sensor through the first switch, the ground fault amplifier circuit being configured to convert the output current to an output voltage; a power supply configured to provide direct current power; and a processor configured to receive the direct current power, to control operation of the first and second switches and, when the first switch is closed, to control operation of the trip actuator based on the amplifier output voltage.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
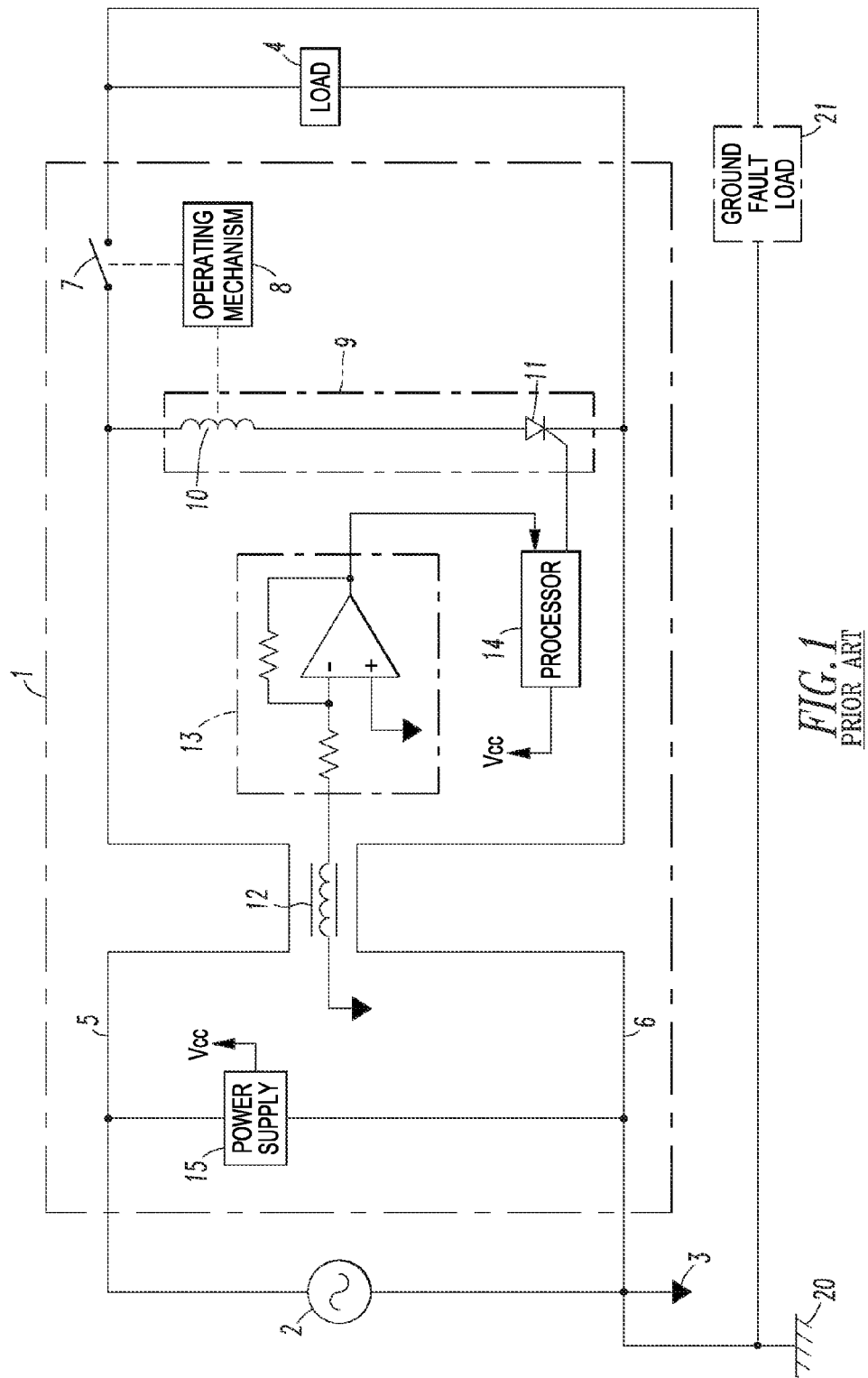
FIG. 1 is a circuit diagram of a system including a prior circuit interrupter.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

As employed herein, the term "switch" means any switch suitable for use in an electrical circuit. The term includes both mechanical type switches (e.g., without limitation, switches which physically separate contacts of the switch) and solid-state type switches (e.g., without limitation, transistors). The term also includes switch assemblies (e.g., without limitation, a transistor combined with a blocking diode).

As employed herein, the term "electrical conductor" shall mean a wire (e.g., without limitation, solid; stranded; insulated; non-insulated), a copper conductor, an aluminum conductor, a suitable metal conductor, or other suitable material or object that permits an electric current to flow easily.

As employed herein, the term "upstream portion of the circuit interrupter" and similar phrases shall mean a portion of the circuit interrupter which is electrically connected to a power source.

As employed herein, the term "downstream portion of the circuit interrupter" and similar phrases shall mean a portion of the circuit interrupter which is electrically connected to a load circuit and is opposite of the upstream side of the circuit interrupter.

As employed herein, the term "processor" shall mean a programmable analog and/or digital device that can store, retrieve and process data; a controller; a control circuit; a computer; a workstation; a personal computer; a microprocessor; a microcontroller; a microcomputer; a central processing unit; a mainframe computer; a mini-computer; a server; a networked processor; or any suitable processing device or apparatus.

Figure 2:
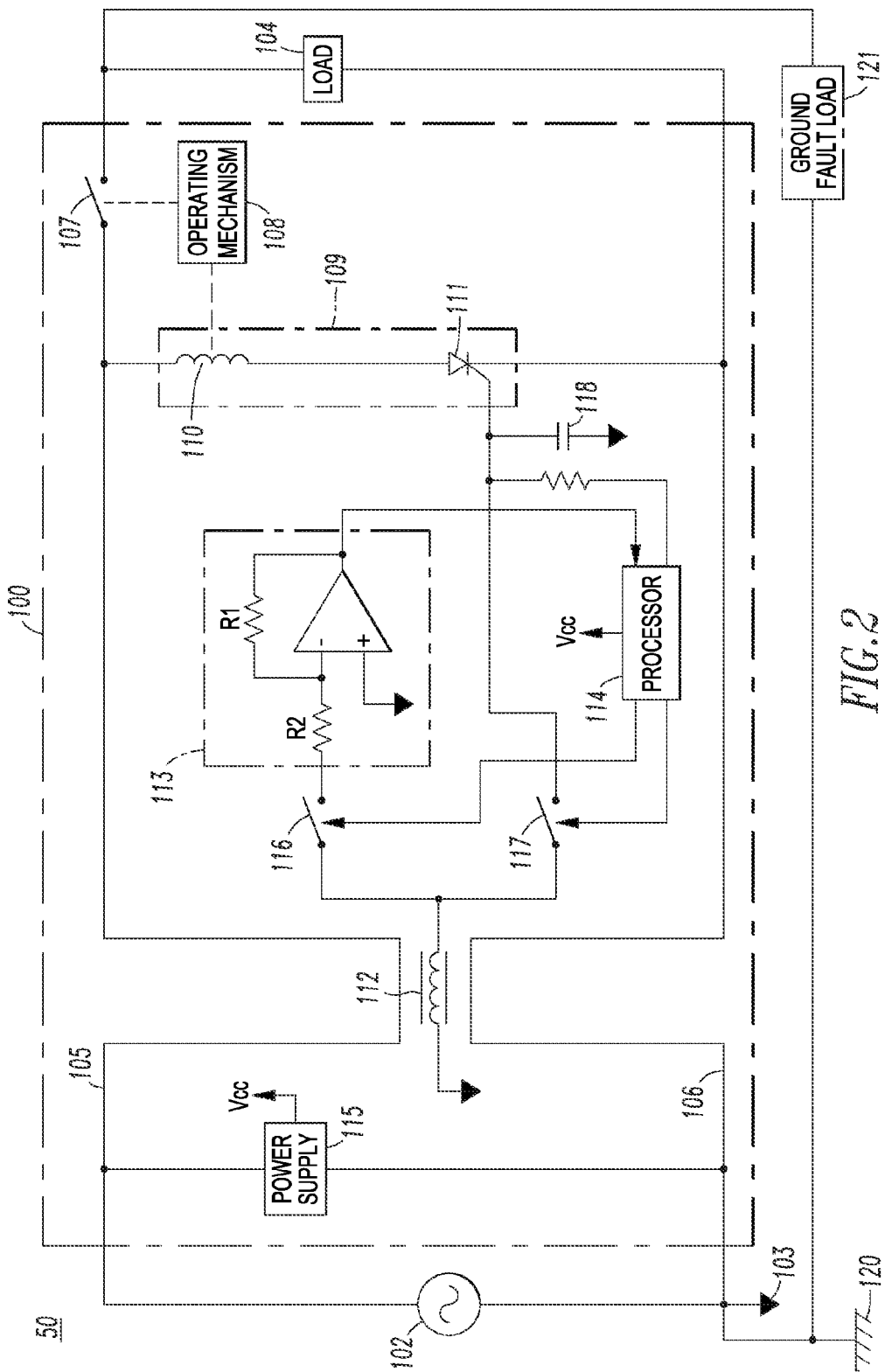
FIG. 2 is a circuit diagram of a system including a circuit interrupter in accordance with an example embodiment of the disclosed concept.

FIG. 2 is a circuit diagram of a system 50 including a circuit interrupter 100. The circuit interrupter 100 is electrically connected to a power source 102 and a neutral 103 on its upstream portion (e.g., without limitation, side) and a load circuit 104 on its downstream portion (e.g., without limitation, side). The circuit interrupter 100 includes first and second electrical conductors 105,106 electrically connected to outputs of the power source 102. It will be appreciated that the second electrical conductor 106 can be electrically connected to a neutral 103 or both the output of the power source 102 and the neutral 103 without departing from the scope of the disclosed concept. Additionally, the power source 102 and/or neutral 103 is electrically connected to ground 120 on the upstream side of the circuit interrupter 100. The impedance between the downstream side of the circuit interrupter 100 and ground 120 is represented by a ground fault load 121. The circuit interrupter 100 also includes separable contacts 107 as well as an operating mechanism 108 configured to open and close the separable contacts 107.

The circuit interrupter 100 further includes a trip circuit which is electrically connected between the first and second electrical conductors 105,106. The trip circuit includes a trip actuator 109 which cooperates with the operating mechanism 108 to trip open the separable contacts 107. The trip actuator 109 includes a trip coil 110 which initiates tripping of the separable contacts 107 when sufficient current is passed therethrough. The trip actuator 109 also includes a silicon controlled rectifier (SCR) 111 which turns on and off to control whether current passes through the trip coil 110. In another non-limiting example embodiment, the SCR 111 can be replaced with a triac (not shown). It will also be appreciated that in other non-limiting embodiments of the disclosed concept, the SCR 111 may be replaced by any other suitable switch (e.g., without limitation, a field effect transistor (FET)). Additionally, the trip actuator 109 can include a solenoid (not shown) which is actuated by the trip coil 110 and cooperates with the operating mechanism 108 to trip open the separable contacts 107.

The circuit interrupter 100 includes a ground fault sensor 112 which is configured to sense a difference between a current through the first electrical conductor 105 and a current through the second electrical conductor 106. The ground fault sensor 112 outputs an output current based on the sensed difference. In the non-limiting example embodiment of FIG. 2, the ground fault sensor 112 is a current transformer. However, it will be appreciated that any suitable circuit which senses the difference between the current through the first electrical conductor 105 and the current through the second electrical conductor 106 and outputs an output signal based on the sensed difference may be used without departing from the scope of the disclosed concept.

The circuit interrupter 100 also includes first and second switches 116,117 electrically connected to the ground fault sensor 112. The first switch 116 is operable to electrically connect the ground fault sensor 112 to a ground fault amplifier circuit 113. When electrically connected to the ground fault sensor 112, the ground fault amplifier 113 converts the output current of the ground fault sensor 112 to an output voltage and outputs the output voltage to a processor 114. The disclosed ground fault amplifier circuit 113 is an inverting amplifier having first and second resistors R1,R2 and an operational amplifier. However, it will be appreciated that any suitable circuit which converts the output current to an output voltage may be employed without departing from the scope of the disclosed concept.

The second switch 117 is operable to electrically connect the ground fault sensor 112 to the trip actuator 109. In one non-limiting example embodiment, the first and second switches 116,117 are FETs. However, it will be appreciated that any suitable switches can be used as the first and second switches 116,117 without departing from the scope of the disclosed concept.

The circuit interrupter 100 further includes a power supply 115. The power supply 115 is electrically connected between the first and second conductors 105,106 and converts alternating current power carried by the first and second conductors 105,106 to direct current power. The direct current power is used to power the processor 114 and other circuitry like the operational amplifier.

The processor 114 controls operations of the first and second switches 116,117, and when the first switch 116 is closed, the processor 114 also controls operation of the trip actuator 109.

In more detail, when the processor 114 begins to power up, the circuit interrupter 100 is in an initial state where the first switch 116 is open and the second switch 117 is closed. Switch 116 should be left open to avoid burdening the ground fault sensor 112 and preventing the SCR 111 from turning on. For example and without limitation, the direct current output from the power supply 115 can be used to initially close the second switch 117. In the initial state, operation of the trip actuator 109 is controlled directly by the output current of the ground fault sensor 112 and the processor 114 is bypassed. As such, the start-up process of the processor 114 will not delay tripping the power to the load 104 circuit due to a ground fault condition. A capacitor 118 across the gate of the SCR 111 can be used to control the duration and magnitude of ground fault current required to turn on the SCR 111.

During or shortly after the start-up process of the processor 114, the processor 114 controls the circuit interrupter 100 to enter a second state where the first switch 116 is closed and the second switch 117 is open. In the second state, the output current of the ground fault sensor 112 is converted to an output voltage by the ground fault amplifier circuit 113. The ground fault amplifier circuit 113 outputs the output voltage to the processor 114. The processor 114 then determines whether a ground fault condition exists based on the output voltage and controls the trip actuator 109 accordingly. In the second state, utilization of the processor 114 allows better control over trip times and levels than controlling the SCR 111 directly with the output of the ground fault sensor 112.

It will be appreciated that the processor 114 can control the circuit interrupter 100 to enter the second state in any suitable manner. In one non-limiting example embodiment, the processor 114 controls the first switch 116 to close and the second switch 117 to open a predetermined time after the processor is initially powered on. In another non-limiting example embodiment, the processor 114 controls the first switch 116 to close and the second switch 117 to open during start-up of the processor 114 (e.g., without limitation, the processor 114 may include start-up instructions which control the first switch 116 to close and the second switch 117 to open).

Figure 3:
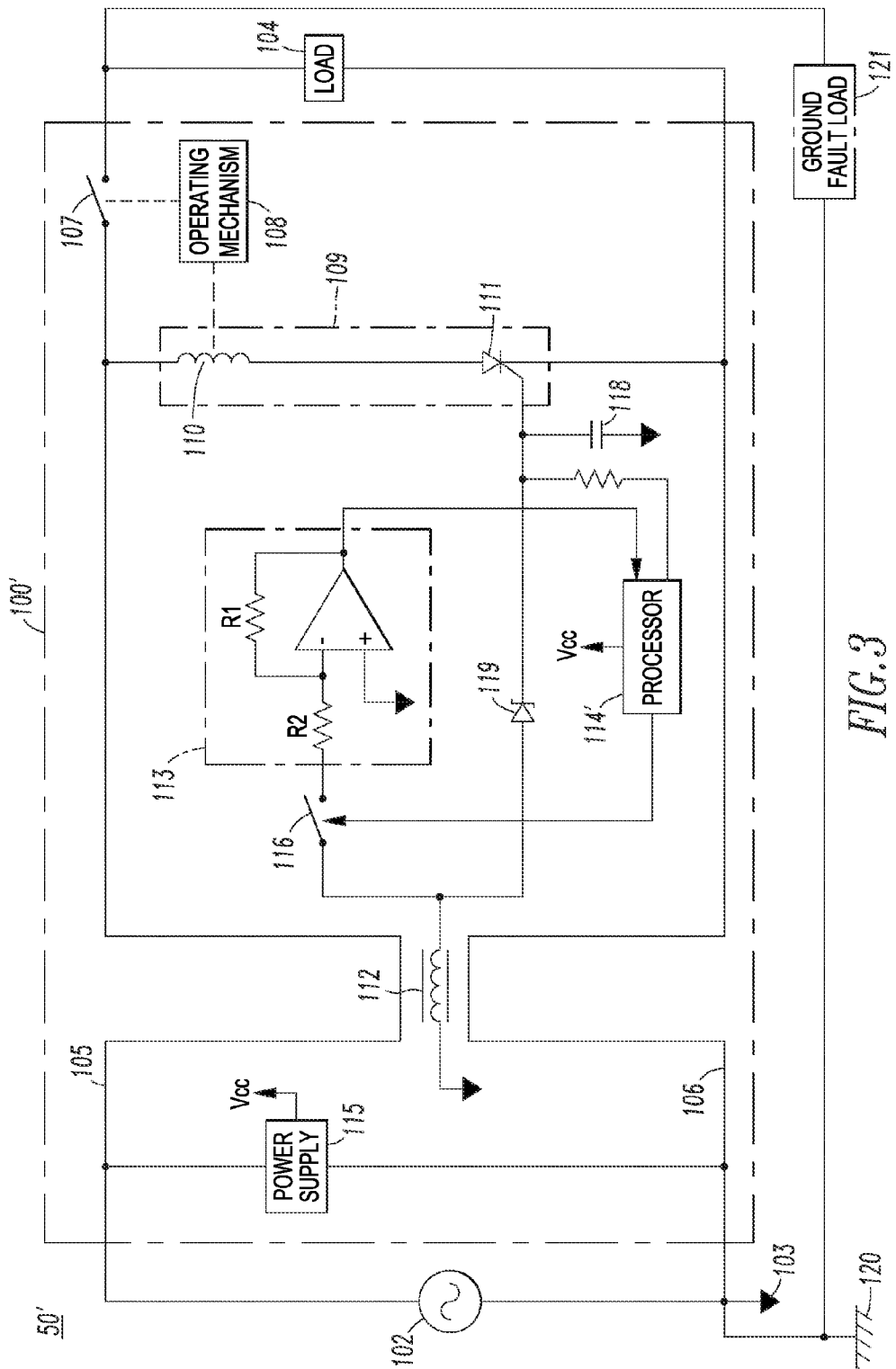
FIG. 3 is a circuit diagram of a system including a circuit interrupter in accordance with another example embodiment of the disclosed concept.

FIG. 3 is a circuit diagram of a system 50' including a circuit interrupter 100' in accordance with another non-limiting example embodiment of the disclosed concept. Circuit interrupter 100' is similar to circuit interrupter 100. However, in circuit interrupter 100', the output of the ground fault sensor 112 is electrically connected to the trip actuator 109 through only a blocking diode 119.

In an initial state of circuit interrupter 100', the first switch 116 is open and operation of the trip actuator 109 is controlled by the output current of the ground fault sensor 112. During or shortly after the start-up process of the processor 114', the processor 114' controls the circuit interrupter 100' to enter a second state where the first switch 116 is closed. In the second state, the output current of the ground fault sensor 112 is converted to an output voltage by the ground fault amplifier circuit 113. The ground fault amplifier circuit 113 outputs the output voltage to the processor 114'. The processor 114' then determines whether a ground fault condition exists based on the output voltage and controls the trip actuator 109 accordingly. The blocking diode 119 is included between the ground fault sensor 112 and the SCR 111 because if it were not there, the ground fault sensor 112 and/or the ground fault amplifier circuit 113 may short out the gate of the SCR 111 and prevent the processor 114' from turning on the SCR 111.

In circuit interrupters 100,100', controlling the trip actuator 109 with the output current from the ground fault sensor 112 avoids a delayed response to a ground fault condition that might be caused by, for example, a start-up process of the processors 114,114'. However, the ground fault amplifier circuit 113 and the processors 114,114' can initiate tripping of power to the load 104 circuit based on a lower ground fault current than by electrically connecting the ground fault sensor 112 to the trip actuator 109. The UL943 allowed trip times depend on the magnitude of the ground fault current. For these lower ground fault currents, UL943 allowed trip times are long enough that the processor 114,114' has time to start, detect the fault, and issue a trip signal. As such, after the start-up process of the processors 114,114', the ground fault amplifier circuit 113 and the processors 114,114' can be used to control the trip actuator 109.

Although single pole circuit interrupters 100,100' having one pair of separable contacts 107 are disclosed, circuit interrupters having any number of poles and any number of separable contacts may be employed.

Although separable contacts 107 are disclosed, suitable solid state separable contacts can be employed. For example, the disclosed circuit interrupters 100,100' include a suitable circuit interrupter mechanism, such as the separable contacts 107 that are opened and closed by the operating mechanism 108, although the disclosed concept is applicable to a wide range of circuit interruption mechanisms (e.g., without limitation, solid state switches like FET or IGBT devices; contactor contacts) and/or solid state based control/protection devices (e.g., without limitation, drives; soft-starters; DC/DC converters) and/or operating mechanisms (e.g., without limitation, electrical, electro-mechanical, or mechanical mechanisms).

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A circuit interrupter comprising:
    a first electrical conductor configured to electrically connect to a first output of a power source;
    a second electrical conductor configured to electrically connect to a second output of said power source or a neutral;
    separable contacts;
    an operating mechanism configured to open and close said separable contacts;
    a trip circuit electrically connected between the first electrical conductor and the second electrical conductor, said trip circuit including a trip actuator configured to cooperate with said operating mechanism to trip open said separable contacts;
    a ground fault sensor configured to sense a difference between a current through the first electrical conductor and a current through the second electrical conductor and to output an output current based on said sensed difference;
    a first switch electrically connected to the ground fault sensor;
    a second switch electrically connected between the ground fault sensor and the trip actuator such that when the second switch is closed the trip actuator is controlled by said output current;
    a ground fault amplifier circuit electrically connectable to the ground fault sensor through the first switch, the ground fault amplifier circuit being configured to convert said output current to an output voltage;
    a power supply configured to provide direct current power; and
    a processor configured to receive said direct current power, to control operation of the first and second switches and, when the first switch is closed, to control operation of the trip actuator based on said output voltage.

2. The circuit interrupter of claim 1, wherein the processor is configured to control the first and second switches such that when one of the first and second switches is closed, the other of the first and second switches is open.

3. The circuit interrupter of claim 1, wherein when the processor is initially powered on by said power supply, the first switch is open and the second switch is closed.

4. The circuit interrupter of claim 3, wherein the processor controls the first switch to close and the second switch to open a predetermined time after the processor is initially powered on.

5. The circuit interrupter of claim 3, wherein the processor controls the first switch to close and the second switch to open during start-up of the processor.

6. The circuit interrupter of claim 1, wherein the first and second switches are field effect transistors.

7. The circuit interrupter of claim 1, wherein the ground fault amplifier circuit is an inverting amplifier circuit including a first resistor, a second resistor, and an operational amplifier.

8. The circuit interrupter of claim 1, wherein said power supply is electrically connected between the first and second electrical conductors; and wherein said power supply is configured to convert power from the first and second electrical conductors to said direct current power.

9. The circuit interrupter of claim 1, wherein the trip actuator comprises a trip coil configured to initiate tripping of said separable contacts when current is passed therethrough and a silicon controlled rectifier configured to turn on and off to control whether current passes through the trip coil.

10. The circuit interrupter of claim 9, wherein the trip actuator further includes a solenoid which is actuated by the trip coil and cooperates with the operating mechanism to trip open said separable contacts.

11. A circuit interrupter comprising:
    a first electrical conductor configured to electrically connect to a first output of a power source;
    a second electrical conductor configured to electrically connect to a second output of said power source or a neutral;
    separable contacts;
    an operating mechanism configured to open and close said separable contacts;
    a trip circuit electrically connected between the first electrical conductor and the second electrical conductor, said trip circuit including a trip actuator configured to cooperate with said operating mechanism to trip open said separable contacts;
    a ground fault sensor configured to sense a difference between a current through the first electrical conductor and a current through the second electrical conductor and to output an output current based on said sensed difference;
    a switch electrically connected to the ground fault sensor;
    a ground fault amplifier circuit electrically connectable to the ground fault sensor through the switch, the ground fault amplifier circuit being configured to convert said output current to an output voltage;
    a diode electrically connected between the ground fault sensor and the trip circuit;
    a power supply configured to provide direct current power; and
    a processor configured to receive said direct current power, to control operation of the switch and, when the switch is closed, to control operation of the trip actuator based on said output voltage,
    wherein the ground fault sensor is electrically connected to the trip actuator such that when the switch is open, the trip actuator is controlled by said output current.

12. The circuit interrupter of claim 11, wherein when the processor is initially powered on by said power supply, the switch is open.

13. The circuit interrupter of claim 12, wherein the processor controls the switch to close a predetermined time after the processor is initially powered on.

14. The circuit interrupter of claim 12, wherein the processor controls the switch to close during start-up of the processor.

15. The circuit interrupter of claim 11, wherein the trip actuator comprises a trip coil configured to initiate tripping open of said separable contacts when current is passed therethrough and a silicon controlled rectifier configured to turn on and off to control whether current passes through the trip coil.

16. The circuit interrupter of claim 9, wherein the trip actuator further includes a solenoid which is actuated by the trip coil and cooperates with the operating mechanism to trip open said separable contacts.

17. A system comprising:
- a power source having first and second outputs;
- a load circuit; and
- a circuit interrupter comprising:
  - a first electrical conductor electrically connected to the first output of the power source;
  - a second electrical conductor electrically connected to the second output of said power source;
  - separable contacts electrically connected in series with said load circuit between said first and second electrical conductors;
  - an operating mechanism configured to open and close said separable contacts;
  - a trip circuit electrically connected between the first electrical conductor and the second electrical conductor, said trip circuit including a trip actuator configured to cooperate with said operating mechanism to trip open said separable contacts;
  - a ground fault sensor configured to sense a difference between a current through the first electrical conductor and a current through the second electrical conductor and to output an output current based on said sensed difference;
  - a first switch electrically connected to the ground fault sensor;
  - a second switch electrically connected between the ground fault sensor and the trip actuator such that when the second switch is closed the trip actuator is controlled by said output current;
  - a ground fault amplifier circuit electrically connectable to the ground fault sensor through the first switch, the ground fault amplifier circuit being configured to convert said output current to an output voltage;
  - a power supply configured to provide direct current power; and
  - a processor configured to receive said direct current power, to control operation of the first and second switches and, when the first switch is closed, to control operation of the trip actuator based on said output current.

18. The system of claim 17, wherein when the processor is initially powered on, the first switch is open and the second switch is closed.

19. The system of claim 18, wherein the processor controls the first switch to close and the second switch to open a predetermined time after the processor is initially powered on.

20. The system of claim 18, wherein the processor controls the first switch to close and the second switch to open during start-up of the processor.

21. The system of claim 17, wherein the second output of the power source is electrically connected to a neutral which is electrically connected to the second electrical conductor.

* * * * *